United States Patent
Duvall et al.

(10) Patent No.: US 6,528,566 B2
(45) Date of Patent: Mar. 4, 2003

(54) LATENT MERCAPTAN AS A HEAT STABILIZER

(75) Inventors: Tod C. Duvall, West Chester, OH (US); Paul B. Adams, Indian Springs, OH (US); Gene K. Norris, Cincinnati, OH (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/133,605

(22) Filed: Aug. 13, 1998

(65) Prior Publication Data

US 2002/0183424 A1 Dec. 5, 2002

Related U.S. Application Data

(63) Continuation-in-part of application No. 09/048,092, filed on Mar. 26, 1998, now Pat. No. 6,003,113, which is a continuation-in-part of application No. 08/890,613, filed on Jul. 9, 1997, now abandoned, which is a continuation-in-part of application No. 08/597,093, filed on Feb. 23, 1996, now abandoned, which is a continuation-in-part of application No. 08/435,413, filed on May 10, 1995, now abandoned.

(51) Int. Cl.[7] .................................................. C08K 5/36
(52) U.S. Cl. ....................... 524/392; 524/110; 524/399; 524/434
(58) Field of Search ............................... 524/392, 110, 524/399, 434

(56) References Cited

U.S. PATENT DOCUMENTS 3,660,331 A * 5/1972 Ludwig ....................... 524/110
4,111,873 A 9/1978 Cordes, III ............. 260/23 XA
4,973,619 A 11/1990 Kemper ........................ 524/285

FOREIGN PATENT DOCUMENTS

EP 0260380 12/1987 ............ C08K/5/37
GB 827393 2/1960

OTHER PUBLICATIONS

Rudolph D. Deanin, Gyanendra Gupta, and Jitendra J. Modi, "The Role of Zinc Chloride in the Stabilization of PVC", American Chemical Society, Organic Coatings and Plastics Chemistry, vol. 40, Apr. 1–6, 1979, pp. 199–203.

* cited by examiner

Primary Examiner—Peter D. Mulcahy

(57) ABSTRACT

Flexible, semi-rigid, and rigid vinyl chloride polymer compositions comprising a latent mercaptan-containing heat stabilizer are substantially free from the offensive odor typically associated with mercaptans and are protected during processing by the degradation products of the latent (i.e., blocked) mercaptan which include a free mercaptan. The free mercaptan thus released enhances the activity of metallic-based heat stabilizers such as zinc carboxylates and organotin carboxylates and mercaptides in the polymer composition. Other products of the degradation are believed to include carbocations of the blocking moiety which are stabilized by a molecular structure in which the electron deficiency is shared by several groups. The latent mercaptan is selected from the group consisting of a 2-S-(tetrahydropyranyl)-thioalkanol, a carboxylic acid ester thereof, a 2-S-(tetrahydropyranyl)-thioglycolic acid, and an ester thereof.

12 Claims, No Drawings

LATENT MERCAPTAN AS A HEAT STABILIZER

This is a continuation in part Ser. No. 09/048,092, Mar. 26, 1998, now U.S. Pat. No. 6,003,113, which is a continuation in part of Ser. No. 08/890,613, filed Jul. 9, 1997, now abandoned, which is a continuation in part of Ser. No. 08/597,093, filed Feb. 23, 1996, now abandoned, which is a continuation in part of 08/435,413, filed May 10, 1995, now abandoned.

FIELD OF THE INVENTION

This invention relates to a heat stabilized halogen-containing polymer composition normally susceptible to heat-induced deterioration which comprises a halogen-containing polymer and the degradation products of a latent mercaptan present during processing of the composition at an elevated temperature, said products being formed during said processing and including a liberated mercaptan. The free mercaptan enhances the activity of metal-based heat stabilizers such as organotin carboxylates and mercaptides in the polymer composition. It particularly relates to the stabilization against heat of vinyl chloride polymer compositions and articles made thereof by a latent mercaptan selected from the group consisting of 2-S-(hydroxyalkylthio) tetrahydropyran, 5-S-(hydroxyalkylthio) tetrahydrofuran, and the carboxylic acid esters thereof in combination with very low levels of a metal-based heat stabilizer or certain Lewis acids. Said latent mercaptans are also referred to hereinafter as 2-S-(tetrahydropyranyl)-thioalkanol, 2-S-(tetrahydropyranyl)thioalkyl carboxylate, and their furanyl homologs, i.e., 5-S-(tetrahydrofuranyl)-thioalkanol and 5-S-(tetrahydrofuranyl)thioalkyl carboxylate.

This invention also relates to articles of manufacture such as rigid pipe and window profile, flexible film, and semi-rigid tubing that are prepared from such heat-stabilized vinyl chloride polymer compositions.

BACKGROUND OF THE INVENTION

It is well known that the physical properties of various organic polymers deteriorate and color changes take place during processing of the polymer and during exposure of formed polymer products to certain environments. Halogen-containing polymers are normally susceptible to heat-induced deterioration through autoxidation. The prime examples of such polymers are the vinyl and vinylidene polymers in which the halogen is attached directly to carbon atoms. Poly(vinyl chloride), copolymers of vinyl chloride and vinyl acetate, and poly(vinylidene chloride), the principal resin in self-clinging transparent food wraps, are the most familiar polymers which require stabilization for their survival during fabrication into pipe, window casings, siding, bottles, wall covering, packaging film, and the like. When such polymers are processed at elevated temperatures, undesirable color changes often occur within the first 5 to 10 minutes as well as during later stages of the processing. Haziness, which sometimes accompanies the color changes, is particularly undesirable where clear products are needed. The addition of heat stabilizers to such polymers has been absolutely essential to the wide-spread utility of the polymers. From a great deal of work in the development of more and more effective heat stabilizers there has emerged two principal classes: organotin compounds and mixed metal combinations. Organotin-based heat stabilizers are the most efficient and widely used stabilizers for rigid PVC. Synergistic combinations of alkyltin mercaptides and free mercaptans are particularly efficient heat stabilizers for rigid PVC during extrusion. They have not been entirely satisfactory, however, because of several failings on the part of the mercaptan synergist and are not used in flexible PVC. Many mercaptans give off an offensive odor even at room temperature and the odor grows worse at PVC processing temperatures. The oxidative stability of the mercaptans is very often very poor. Oxidation of the free mercaptans diminishes the synergism. A combination having an enhanced synergism would be welcomed especially by the flexible PVC industry. Also, because of the end-use of articles made from some polymers, many polymeric compositions require the presence of both biocides and heat stabilizers but the use of the organotin mercaptide/mercaptan combination in such a composition is often frustrated by the tendency of the free mercaptan to deactivate a biocide such as the much used OBPA (10, 10'-oxybisphenoxarsine).

Zinc salts in general have long been believed to be less satisfactory as heat stabilizers for halogen-containing polymers than the organotin-based stabilizers and, indeed, have lent their name to the catastrophic degradation known as zinc burn. In U.S. Pat. No. 3,660,331, Ludwig teaches the stabilization of vinyl halide resins by certain thioethers and thioesters of tetrahydropyran. Better heat stabilizer compositions are still needed, however. The thioether/low level metallic stabilizer combinations of this invention satisfy that need.

SUMMARY OF THE INVENTION

It has now been found that the activity of the 2-S-(tetrahydropyranyl)thioalkanol, the carboxylates thereof, and their furanyl homologs as heat stabilizers in halogen-containing polymer compositions is unexpectedly higher than that predicted on the basis of sulfur content when used in conjunction with very low levels of a metal-based stabilizer or a Lewis acid. Zinc salts are particularly valuable as synergists of latent mercaptans in their function as heat stabilizers for halogen-containing polymers. Zinc chloride, a Lewis acid, is of particular interest as such a synergist.

It is an object of this invention, therefore, to provide a heat stabilizer composition having the synergy of a mercaptan plus improved oxidative stability.

It is another object of this invention to provide a halogen-containing polymer composition stabilized against heat by 2-S-(tetrahydropyranyl)thioalkanols, carboxylates thereof, and their furanyl homologs in combination with a synergistic amount of a metal-based stabilizer or a Lewis acid.

It is another object of this invention to provide a PVC composition and article stabilized against heat by 2-S-(tetrahydropyranyl)thioalkanols, carboxylates thereof, and their furanyl homologs in combination with a synergistic amount of a metal-based stabilizer or a Lewis acid.

It is a related object of this invention to stabilize rigid, semi-rigid, and flexible PVC resin compositions with a heat stabilizer composition of this invention.

It is another object of this invention to provide a latent mercaptan-containing heat stabilizer composition which is substantially free from the offensive odor typically associated with mercaptans.

It is still another object of this invention to provide a flexible PVC composition and article stabilized against heat by a 2-S-(tetrahydropyranyl)thioalkyl carboxylate, its furanyl homolog, or a mixture thereof, in combination with a synergistic amount of a zinc salt.

These and other objects of the invention which will become apparent from the following description are achieved by adding a 2-S-(tetrahydropyranyl)thioalkanol, a carboxylate thereof, a furanyl homolog of either or both, or a mixture of two or more of said alkanols and esters, and a synergistic amount of a metal-based heat stabilizer or Lewis acid or a mixture of said metal-based heat stabilizer and Lewis acid to a halogen-containing polymer composition and processing the composition at an elevated temperature at which the latent mercaptan degrades to liberate a free mercaptan. The terms "latent mercaptan" and "blocked mercaptan" are used interchangeably herein.

Other products of the degradation of the blocked mercaptan are believed to include carbocations of the blocking moiety which are stabilized by a molecular structure in which the electron deficiency is shared by several groups. Resonance stabilization and neighboring group stabilization are two of the possible mechanisms by which the carbocations may be stabilized. The carbocations act as intermediates in the formation of stable compounds early in the hot processing of halogen-containing polymers. Although such mechanisms and the resultant carbocations are believed to be an impetus for the liberation of the active free mercaptan, this invention is in no way limited by the foregoing attempt to explain the working of the invention. Those skilled in the art will see the resonance stabilization and neighboring group stabilization that are possible in the following structures of the blocked mercaptan; other mechanisms may be at work in other blocked mercaptans represented by these structures that also liberate an active free mercaptan upon thermal and/or chemical degradation during processing of polymeric compositions containing such blocked mercaptans. For the purposes of this invention, the terms "blocked mercaptan" and "latent mercaptan" are used interchangeably to mean a thioether which degrades during processing of the composition at an elevated temperature to liberate a free mercaptan.

DETAILED DESCRIPTION OF THE INVENTION

The term halogen-containing organic polymers as used herein means halogen-containing polymers or resins in which the halogen is attached directly to the carbon atoms. The halogen-containing polymers which can be stabilized according to this invention include chlorinated polyethylene having 14 to 75%, e.g. 27%, chlorine by weight, chlorinated natural and synthetic rubber, rubber hydrochloride, chlorinated polystyrene, chlorinated polyvinyl chloride, polyvinyl bromide, polyvinyl fluoride, and vinyl chloride polymers. The vinyl chloride polymers are made from monomers consisting of vinyl chloride alone or a mixture of monomers comprising, preferably, at least about 70% by weight of vinyl chloride, based on the total monomer weight. Examples of the copolymers include those made from vinyl chloride and from about 1 to about 30% of a copolymerizable ethylenically unsaturated material such as vinyl acetate, vinyl butyrate, vinyl benzoate, vinylidene chloride, diethyl fumarate, diethyl maleate, other alkyl fumarates and maleates, vinyl propionate, methyl acrylate, 2-ethylhexyl acrylate, butyl acrylate and other alkyl acrylates, methyl methacrylate, ethyl methacrylate, butyl methacrylate and other alkyl methacrylates, methyl alpha-chloroacrylate, styrene, trichloroethylene, vinyl ketones such as vinyl methyl ketone and vinyl phenyl ketone, 1-fluoro-2-chloroethylene, acrylonitrile, chloroacrylonitrile, allylidene diacetate, chloroallylidene diacetate, and vinyl ethers such as vinyl ethyl ether, vinyl chloroethyl ether, vinyl phenyl ether, and the vinyl ether prepared by the reaction of one mole of acrolein with one mole of ethylene glycol divinyl ether. Typical copolymers include vinyl chloride-vinyl acetate (96:4 sold commercially as VYNW), vinyl chloride-vinyl acetate (87:13), vinyl chloride-vinyl acetate-maleic anhydride (86:13:1), vinyl chloride-vinylidene chloride (95:5); vinyl chloride-diethyl fumarate (95:5), and vinyl chloride 2-ethylhexyl acrylate (80:20).

As used herein, the term PVC composition means a composition comprising a halogen-containing vinyl polymer in which the halogen is attached directly to a carbon atom. A rigid PVC composition is one which does not contain a plasticizer. A semi-rigid PVC composition is one which contains from 1 to about 25 parts of a plasticizer per 100 parts by weight of the halogen-containing vinyl polymer. A flexible PVC composition contains from about 25 to about 100 parts per 100 parts by weight of the halogen-containing vinyl polymer. Alkyl esters of carboxylic acids in which there are from 1 to 3 alkyl groups having from 8 to 12 carbon atoms are representative of the plasticizers. The alkyl group may be n-octyl, 2-ethylhexyl, nonyl, decyl, or dodecyl. Suitable esters include phthalates, trimellitates, benzoates, adipates, glutarates, and sebacates. The plasticizer may also be a pentaerythritol or such an ester thereof. A polymeric plasticizer is also suitable.

As used herein, a hydrocarbyl radical contains from 1 to 20 carbon atoms and may be an alkyl, cycloalkyl, aryl, arylene, alkaryl, aralkyl, or an aralkenyl or alkenyl radical having up to 3 ethylene double bonds; likewise, said radicals constitute the hydrocarbyl portion of a hydroxyhydrocarbyl radical. As used herein: a mono-valent radical has but one valence available for combining with another radical whereas a di-valent radical may combine with two other radicals; the term alkyl represents monovalent straight or branched chain hydrocarbon radicals; the term alkylenyl represents divalent, trivalent, and tetravalent straight or branched chain hydrocarbon radicals; the term oxyalkylenyl represents a divalent radical of a polyalkylene ether molecule having a polyalkoxy chain of from 2 to 4 of such radicals, wherein the alkylene moiety has 2 or 3 carbon atoms.

Also, as used herein: an acyloxyalkyl radical originates from a carboxylic acid ester of an alkyl alcohol; the $R^1$ radical in Formula 1 below, therefore, in the stearic acid ester of mercaptopropanol is the stearoyloxypropyl radical; likewise, the $R^1$ radical of the oleic acid ester of mercaptopropanol, which is one of the tallate esters of that alcohol, is the oleoyloxypropyl radical. The $R^1$ radical of lauryl-3-mercaptopropionate, on the other hand, is dodecyloxycarbonylpropyl.

Substantially means largely if not wholly that which is specified but so close that the difference is insignificant.

The stabilizer compositions of this invention consist essentially of from about 87.5% to about 98.5%, preferably from about 93.5% to about 97.5%, by weight of a 2-S-(tetrahydropyranyl)thioalkanol, a 2-S-(tetrahydrofuranyl) thioalkanol, a carboxylate of either or both, or a mixture of two or more of said alkanols and esters, based on the total weight of the stabilizer composition, the balance comprising the metal-based stabilizer or Lewis acid. They are particularly suited to impart superior stabilization against the deteriorative effects of heat and ultra-violet light on both rigid and flexible PVC resins in comparison with stabilizer compositions previously known in the art. They may be prepared by blending the components thereof in any convenient manner which produces a homogeneous mixture, such as by shaking or stirring in a container. Likewise, the stabilizer compositions of this invention can be incorporated in a halogen-containing polymer by admixing the components of the stabilizer composition and of the polymer composition, such as, for example, in an appropriate mill or mixer or by any other of the well-known methods which provide uniform distribution of the stabilizer throughout the polymer composition.

One of the advantages of this invention is that the offensive odor of mercaptans is masked by a blocking group so that the latent mercaptan thus created may be put into a PVC composition or the like with little or no offense to the operator with the knowledge that the free mercaptan will be released as a degradation product when the treated composition is heated during the usual processing, e.g. extrusion.

The blocking compounds are preferably those which are capable of furnishing a stabilized carbocation having a molecular structure in which the electron deficiency is shared by several groups. Resonance stabilization and neighboring group stabilization are two of the possible mechanisms by which the carbocations may be stabilized.

The blocked mercaptans suitable for the purposes of this invention are represented by FORMULA 1:

FORMULA 1

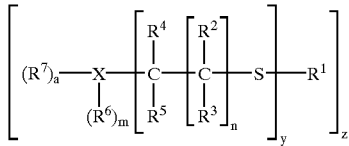

wherein a is 1, m is 0, n is 0 or 1; y is 1 or 2, and z is 1; $R^1$ is a hydroxyalkyl group, a hydroxy(polyalkoxy)alkyl group, an acyloxyalkyl group, an acyloxy(hydroxyalkyl) group, acyloxy(alkoxyalkyl) group, an alkylene bis-(acyloxyalkyl) group, a hydroxy(polyalkoxy)acylalkyl group, an acyloxy (polyalkoxy)alkyl group, an oxy[bis(alkoxyacylalkyl)] group, an oxy[bis(polyalkoxyacylalkyl] group, a benzoyloxy(polyalkoxy)alkyl group, or a benzoyloxy (polyalkoxy)acylalkyl group, in which the alkyl moieties have from 2 to 20 carbon atoms, and the acyloxy moiety has from 2 to 22 carbon atoms; $R^2$, $R^3$, $R^4$, and $R^5$ are hydrogen; and either $R^3$ or $R^5$ is joined with $R^7$ and O to form a heterocyclic moiety having 4 or 5 ring carbons with or without an alkoxy ($C_1$–$C_4$), aryloxy ($C_6$–$C_{10}$), alkaryloxy ($C_7$–$C_{14}$) or formyl substituent.

The mercaptans useful in this invention are the well-known mercaptoalkanols and mercaptocarboxylic acids and the esters of each. They include, but are not limited to, the following compounds:

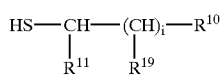

(MC1)

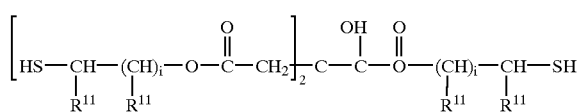

(MC3)

wherein $R^{10}$ and $R^{19}$ are independently OH, —O(C═O) $R^{17}$ —(C═O)OR$^{17}$, —SH, aryl, $C_1$ to $C_{18}$ alkyl, and —H;

$R^{11}$ is —H, aryl, or $C_1$ to $C_{18}$ alkyl;
$R^{17}$ is —H, alkyl, alkenyl, aryl, aralkyl, alkaryl, cycloalkyl, or cycloalkylenyl;
wherein i=0 or an integer from 1 to 6 inclusive.

Mercaptan-containing organic compounds preferred as intermediates in the preparation of the latent mercaptans of this invention are those compounds according to formula (MC1) where $R^{11}$ is —H, $R^{19}$ is —H, $R^{10}$ is —O(C═O)$R^7$ or —(C═O)OR$^{17}$ and i=1; and those compounds according to formula (MC3) where $R^{11}$ is —H and i=1.

Examples of mercaptan-containing compounds described by the above formulas include, but are not limited to, the following compounds: $HSCH_2CH_2OH$ $HSCH_2CH2CH_2OH$ $HSCH_2COOH$ $HSCH_2COOC_8H_{17}$ $HSCH_2CH_2CH_2CH(OH)CH_2CH(OH)$ $HSCH_2CH_2OC(═O)C_{17}H_{33}$ $HSCH_2CH_2CH_2OC(═O)C_8H_{17}$ $HSCH_2CH_2OC(═O)CH═CHC(O═)$ $OCH_2CH_2SH$ $HSCH_2CH_2OC(═O)C_{11}H_{23}$ $HSCH_2CH_2OC(═O)CH_2CH_2C(═O)OCH_2CH_2SH$ $HSCH_2CH_2OC(═O)(CH_2)_4C(═O)OCH_2CH_2SH$

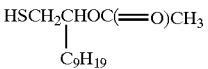

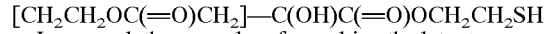

In general, the procedure for making the latent mercaptans which are useful in this invention comprises adding the mercapto group of the free mercaptan across the double bonds of polarized, unsaturated compounds is as follows:

To a stirred mixture, under nitrogen atmosphere, of the mercaptan, acid catalyst, and optionally, a small percentage of antioxidant to inhibit radical reactions, is added dropwise to the polarized, unsaturated compound, either neat or in solution, while maintaining the temperature between 10°–70° C. The mixture or solution is then heated for between 1 and 6 hours at 35°–70° C. and conversion to product is monitored by gas chromatography and iodine titration for SH. The acid catalyst is removed by an alkaline wash and the resulting product is dried with magnesium sulfate and filtered. The solvent, if required, is removed under reduced pressure at <50° C. to yield the latent mercaptan. A solid phase catalyst may be used and then filtered out of the reaction mixture and regenerated for use in a subsequent synthesis, In this way, a wash step is eliminated.

The polarized, unsaturated compounds are exemplified by 3,4-dihydropyran; 3,4-dihydro-2-methoxy-2H-pyran; 3,4-dihydro-2-ethoxy-2H-pyran; 3,4-dihydro-2-phenoxy-2H-pyran; 3,4-dihydro-2-formyl-2H-pyran; and 2,3-dihydrofuran. The 3,4-dihydro-2-formyl-2H-pyran is made by the Diels-Alder dimerization of acrolein at high temperatures and pressures. The 3,4-dihydro-2-alkoxy-2H-pyrans and 3,4-dihydro-2-phenoxy-2H-pyran are made by the reaction of the corresponding vinyl ether with acrolein in the presence of a catalytic amount of a zinc salt, e.g., zinc chloride. A variety of 3,4-dihydro-2H-pyrans having a substituent in the 2-position can be made by similar reactions. The products formed by the reaction of 1 and 2 moles of acrolein with the divinyl ether of an alkylene- or polyalkylene glycol are blocking agents, also. The latent mercaptans made from the di-(3,4-dihydropyranyl) ethers also have the potential of being chelating agents in the polymer compositions of this invention. In the case of the reaction of one mole of acrolein per mole of a divinyl ether, the vinyl ether group of the resulting monomer permits the product to be incorporated into a vinyl chloride copolymer followed by the addition of a mercaptan across the double bond of the pyran ring to yield a latent mercaptan that is an integral stabilizer for the polymer. The reaction of one mole of acrolein with one mole of the divinyl ether also allows for the formation of a monomeric latent mercaptan of the mercaptan/tetrahydropyran adduct type in which the vinyl ether group of the resulting monomer permits the product to be copolymerized with one or more of a wide variety of ethylenically unsaturated compounds to form polymeric latent mercaptans. The product from the reaction of acrolein with chloroethyl vinyl ether provides a substituted 3,4-dihydropyran that can be further derivatized. The addition of a mercaptan across the double bond of the pyran ring can be done in the presence of the zinc salt catalyst to yield a stabilizer composition of this invention.

When 2-S-tetrahydopyranylthioethanol is prepared from 3,4-dihydropyran by said procedure, by-products having the following formulas (as each relates to FORMULA 1) are also obtained:

FORMULA

2.

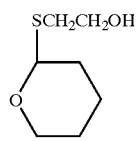

a=1, m=0, n=0, y=1, z=1; X is oxygen, $R^5$ and $R^7$ join to form —$CH_2$—$CH_2$—$CH_2$—$CH_2$—; $R^4$ is hydrogen, and $R^1$ is hydroxyethyl

3.

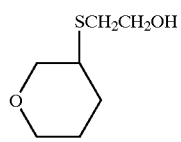

a=1, m=0, n=1, y=1, z=1; X is oxygen, $R^3$ and $R^7$ join to form —$CH_2$—$CH_2$—$CH_2$—; $R^2$, $R^4$ and $R_5$ are hydrogen, and $R^1$ is hydroxyethyl.

4.

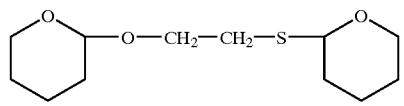

a=1, m=0, n=0, y=1, z=1; X is oxygen, $R^5$ and $R^7$ join to form —$CH_2$—$CH_2$—$CH_2$—$CH_2$—; $R^4$ is hydrogen, and $R^1$ is 2-ethoxytetrahydropyranyl.

5.

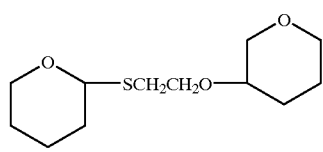

a=1, m=0, n=0, y=1, z=1; X is oxygen, $R^5$ and $R^7$ join to form —$CH_2$—$CH_2$—$CH_2$—$CH_2$—; $R^4$ is hydrogen, and $R^1$ is 3-ethoxytetrahydropyranyl.

6.

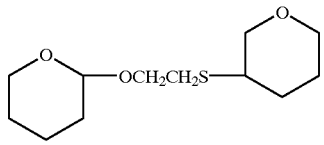

a=1, m=0, n=1, y=1, z=1; X is oxygen, $R^3$ and $R^7$ join to form —$CH_2$—$CH_2$—$CH_2$—; $R^2$, $R^4$ and $R^5$ are hydrogen, and $R^1$ is 2-ethoxytetrahydropyranyl.

7.

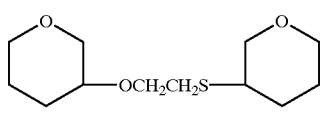

a=1, m=0, n=1, y=1, z=1; X is oxygen, $R^3$ and $R^7$ join to form —$CH_2$—$CH_2$—$CH_2$—; $R^2$, $R^4$ and $R^5$ are hydrogen, and $R^1$ is 3-ethoxytetrahydropyranyl.

The homologous by-products are expected when 2,3-dihydrofuran is reacted with mercaptoethanol but the principal product is the 5-S-tetrahydrofuranylthioethanol shown by the following structure:

8.

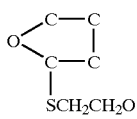

When the 3,4-dihydropyran is replaced by a 3,4-dihydro-2-alkoxy-pyran; a 3,4-dihydro-2-phenoxy-pyran; or a 3,4-dihydro-2-formyl-pyran in the above procedure, the following products are formed:

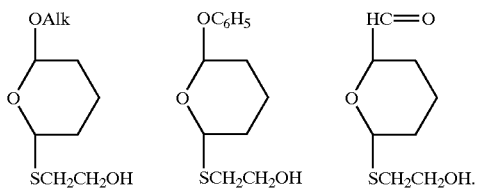

Examples of 2-S-(tetrahydropyranyl)thioalkanols that are suitable as latent mercaptans for this invention include, without limitation, 2-S-(tetrahydropyranyl)thioethanol, 2-S-(tetrahydropyranyl)thiopropanol, and 2-S-(tetrahydropyranyl)-thiobutanol. The carboxylates suitable for the purposes of this invention are exemplified by 2-S-(tetrahydropyranyl)thioethyl caprate, which also may be named 2-S-(2-decanoyloxyethylthio) tetrahydropyran, made by the reaction between mercaptoethyl caprate and 3,4-dihydropyran according to the foregoing procedure and has the following formula in relation to FORMULA 1:

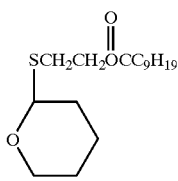

wherein a=1, m=0, n=0; y=1, z is 1; X is oxygen, $R^5$ and $R^7$ are joined to form —$CH_2$—$CH_2$—$CH_2$—$CH_2^4$—; R is hydrogen, and $R^1$ is decanoyloxyethyl.

Homologs of the thus described compounds which are particularly useful in the stabilization of flexible PVC compositions include the 2-S-(tetrahydropyranyl)thioalkyl carboxylates and their furanyl homologs wherein the ethyl moiety is replaced by propyl, butyl, hexyl, and others in the series up to and including dodecyl and the capric acid radical of said compound is replaced by other fatty acid radicals (saturated and unsaturated) or resin acid radicals having up to and including 22 carbon atoms. The acids are exemplified by caproic, caprylic, lauric, myristic, palmitic, stearic, arachidic, behenic, and the oleic and linoleic acids, as such, or as found in tall oil acids along with abietic and pimaric acids. The mercaptoalkyl carboxylate moiety is thus exemplified by mercaptoethyl laurate, mercaptoethyl oleate, mercaptoethyl hexanoate, mercaptoethyl octanoate, mercaptoethyl myristate, mercaptoethyl palmitate, mercaptoethyl stearate, and the mercaptopropyl, mercaptobutyl, and mercaptooctyl homologs of each of the above. The esters are made by the conventional method of reacting the hydroxyl group of a mercaptoalkanol with the desired carboxylic acid in the presence of an acidic catalyst and removing water as it forms.

The 2-S-(tetrahydropyranyl)thioalkanols, the carboxylates thereof, and their furanyl homolgs are employed in this invention in an amount sufficient to impart the desired resistance to heat deterioration to halogen-containing organic polymers. It will be readily apparent to one of ordinary skill in the art, that the precise amount of stabilizer composition used will depend upon several factors, including, but not limited to, the particular halogen-containing organic polymer employed, the temperature to which the polymer will be subjected, and the possible presence of other stabilizing compounds. In general, the more severe the conditions to which the halogen-containing organic polymer is subjected, and the longer the term required for resisting degradation, the greater will be the amount of stabilizer composition required. Generally, as little as about 0.20 part by weight of the latent mercaptan per hundred parts by weight of the PVC resin will be effective. While there is no critical upper limit to the amount of latent mercaptan which can be employed, amounts of about 3.0 parts or less by weight per hundred parts of the PVC resin are preferred.

A 2-S-(tetrahydropyranyl)mercaptoalkyl carboxylate is more active as a heat stabilizer in flexible PVC compositions than the tetrahydropyranyl-blocked mercaptans derived from alkylmercaptans such as dodecanethiol when activated according to this invention as manifest in the improved color hold properties and dynamic thermal stability of such stabilized PVC compositions. The higher activity may be the result of the better compatibility of the ester-containing latent mercaptans with a plasticized PVC. The compatibility of the corresponding homologous furan-based latent mercaptans is similar.

Metallic-based stabilizers are defined for the purposes of this invention as metal salt stabilizers, organometallic stabilizers. For the purposes of this invention, metal salts are defined to include oxides, hydroxides, sulfides, sulfates, chlorides, bromides, fluorides, iodides, phosphates, phenates, perchlorates, carboxylates, and carbonates. The metal salt stabilizers are exemplified by zinc, barium, strontium, calcium, tin, magnesium, cobalt, nickel, titanium, antimony, and aluminum salts of hydrochloric acid, sulfuric acid, phenols, aromatic carboxylic acids, fatty acids, epoxidized fatty acids, oxalic acid, acetic acid, and carbonic acid. Calcium stearate, calcium 2-ethylhexanoate, calcium octoate, calcium oleate, calcium ricinoleate, calcium myristate, calcium palmitate, calcium laurate, barium laurate, barium stearate, barium di(nonylphenolate), magnesium stearate, zinc octoate (or caprylate), zinc 2-ethylhexanoate, zinc stearate, zinc laurate, zinc oxide, zinc chloride, zinc hydroxide, zinc sulfide, zinc sulfate, zinc bromide, and Group I and II metal soaps in general are examples of suitable salts along with tin stearate, aluminum stearate, and hydrotalcite. The synergistic amount of the metallic-based stabilizer is from about 0.01 to less than 0.5%, preferably 0.02–0.4%, and more preferably 0.03–0.1% by weight of the halogen containing resin. The zinc salts are much preferred because they provide not only dynamic stability to the heat processed resin but also superior color hold properties in comparison with the other metal salts, especially at very low concentrations such as from 0.03 to 0.1%.

The Lewis acids are exemplified by boron trifluoride, aluminum chloride, zinc chloride and methyltin trichloride. Thus, there is some overlap between the metal salts and Lewis acids that are useful in this invention. The synergistic amounts of the Lewis acids for the purposes of this invention are from about 0.005 to less than 0.5%, preferably from about 0.01, more preferably from about 0.03, to about 0.1% by weight of the halogen-containing resin. The Lewis acids and the metallic-based stabilizers may be used in combination.

Conventional organometallic stabilizers include the organotin carboxylates and mercaptides. Such materials include butyltin tris dodecyl mercaptide, dibutyltin dilaurate, dibutyltin didodecyl mercaptide, dianhydride tris dibutylstannane diol, dihydrocarbontin salts of carboxy mercaptals such as those set forth in Hechenbleikner et al.(U.S. Pat. No. 3,078,290). There can be included any of the vinyl chloride resin stabilizers set forth in Salyer (U.S. Pat. No. 2,985,617).

Monosulfides and/or polysulfides of the organotin mercaptides of carboxylates and/or mercaptoalkyl carboxylates and of alkyl thioglycolates are also suitable as metal based stabilizers in the compositions of this invention for improving the resistance of halogen-containing polymers to deterioration when heated to 350° F. (177° C.) during processing. The sulfides may be made by heating stoichiometric quantities of a mercaptoalkyl ester of a carboxylic acid or an alkyl mercaptocarboxylate and an organotin chloride having the formula:

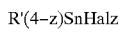

R'(4−z)SnHalz    II wherein R' is an alkyl group having from 1 to 12 carbon atoms, Hal is a halogen having an atomic weight of from 35 to 127, preferably chlorine, and z is any number from 1 to 3;

in water and ammonium hydroxide to about 30° C. (86° F.), slowly adding an alkali metal mono- or polysulfide, and heating the reaction mixture further to about 45° C. before separating the product from said mixture.

Alternatively, the sulfide may be made by mixing a monoalkyl- or dialkyltin sulfide with an organotin mercaptide and by other procedures well known in the stabilizer art.

The sulfides of a mercaptoalkyl ester of a carboxylic acid are characterized by an equilibrium mixture of one or more alkyltin halides of Formula II, one or more mercaptides of Formula III and one or more alkyltin mono- or polysulfides or oligomers thereof and the alkyltin mono- and polysulfides having the formula IV.

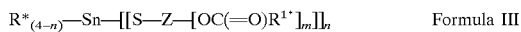
$$R^*_{(4-n)}\text{—Sn—}[[S\text{—}Z\text{—}[OC(=O)R^{1*}]_m]]_n \qquad \text{Formula III}$$

wherein R* is an alkyl radical having from 1 to 12 carbon atoms; $R^{1*}$ is hydrogen, a hydrocarbyl radical, a hydroxyhydrocarbyl radical, or $R^{2*}C(=O)OR^{3*}$, wherein $R^{2*}$ is alkylene, hydroxyalkylene, phenylene, or —CH=CH—, and $R^{3*}$ is hydrogen, a hydrocarbyl radical, a hydroxyhydrocarbyl radical, or an alkylcarboxyalkylene radical; Z is an alkylene or hydroxyalkylene radical of at least 2 carbon atoms up to 20 carbon atoms; m is an integer from 1 to 3, n is from 2 to 3, and the valency of Z is m+1.

Formula IV is representative of linear structures as well as of cyclic trimers and adamantyl rings:

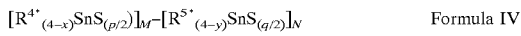
$$[R^{4*}_{(4-x)}SnS_{(p/2)}]_M\text{-}[R^{5*}_{(4-y)}SnS_{(q/2)}]_N \qquad \text{Formula IV}$$

wherein $R^{4*}$ and $R^{5*}$ are independently alkyl radicals having from 1 to 12 carbon atoms and are bonded to Sn; x is 2 or 3; y is 2 or 3; p and q are 2 to 20, preferably 2–4; and M and N are 0–10, preferably 0–4, but M≠N=0; with the proviso that when (4−x)=(4−y), p=q, and when (4−x)≠(4−y), p≠q.

It should be understood that the structures of the sulfides produced by the processes mentioned above are very complex. The reactions are believed to produce an equilibrium mixture composed of several different but related products. As will be appreciated by those of ordinary skill in chemistry, equilibrium mixtures inherently include the starting materials as well as the products of any reaction between them. The chemical and patent literature contain numerous examples demonstrating that members of different classes of organotin compounds may react with one another under certain conditions to yield products containing one or more tin atoms wherein at least a portion of the tin atoms are bonded to different combinations of radicals than they were before being mixed together. Accordingly, the sulfides are believed to include bis[monoorganotin)-bis(thioalkyl carboxylate)] monosulfides and polysulfides, bis [(diorganotin)-mono(thioalkyl carboxylate)]monosulfides and polysulfides, and products which arise during equilibrium reactions among said mono- and polysulfides, including monoalkyltin tris(thioalkyl carboxylates), dialkyltin bis (thioalkyl carboxylates), mono- and di-organotin mono- and polysulfides, and oligomers thereof, as well as the starting materials themselves. The sulfide of an alkyl ester of a mercaptocarboxylic acid is likewise believed to include bis[monoorganotin)-bis(alkyl mercaptocarboxylate)] monosulfides and polysulfides, bis[(diorganotin)-mono(alkyl mercaptocarboxylate)]monosulfides and polysulfides, and products which arise during equilibrium reactions among said mono- and polysulfides, including monoalkyltin tris (alkyl mercaptocarboxylates), mono- and di-organotin mono- and polysulfides, and oligomers thereof.

The polysulfides include mixtures of compounds having from 2 to 10 sulfur atoms linked together. Mixtures of monosulfides and polysulfides having from 2 to 4 sulfur atoms are preferred.

Conventional non-metallic stabilizers and antioxidants can also be included in the PVC compositions of the present invention. Thus, there can be included 0.01–0.75%, based on the weight of the resin, of sulfur containing compounds such as dilauryl-thiodipropionate, distearyl 3,3'-thiodipropionate, dicyclohexyl-3,3-thiodipropionate, dioleyl-3,3'-thiodipropionate, dibenzyl-3,3'-thiodipropionate, didecyl-3, 3'-thiodipropionate, dibenzyl-3,3'-thiodipropionate, diethyl-3,3'-thiopropionate, lauryl ester of 3-methylmercaptopropionic acid, lauryl ester of 3-butylmercaptopropionic acid, lauryl ester of 3-lauryl mercaptopropionic acid, and phenyl ester of 3-octyl mercaptopropionic acid.

In addition to the stabilizer compositions of this invention, the PVC compositions of this invention may contain plasticizers, as mentioned above in regard to flexible PVC, and conventional additives such as pigments, fillers, blowing agents, dyes, ultraviolet light absorbing agents, antioxidants, densifying agents, biocides, and the like.

An antioxidant may be added in an amount of 0.01–10%, preferably 0.1–5% by weight of the PVC resin. Phenolic antioxidants are particularly suitable and are exemplified by 2,6-di-t-butyl-p-cresol, butylated hydroxyanisole, propyl gallate, 4,4'-thiobis(6-t-butyl-m-cresol), 4,4'-cyclohexylidene diphenol, 2,5-di-t-amyl hydroquinone, 4,4'-butylidene bis(6-t-butyl-m-cresol), hydroquinone monobenzyl ether, 2,2'-methylene-bis(4-methyl-6-t-butyl phenol), 2,6-butyl-4-decyloxy phenol, 2-t-butyl-4-dodecyloxy phenol, 2-t-butyl-4-dodecyloxy phenol, 2-t-butyl-4-octadecyloxy phenol, 4,4'-methylene-bis(2,6-di-t-butyl phenol), p-amino phenol, N-lauryloxy-p-amino phenol, 4,4'-thiobis (3-methyl-6-t-butyl phenol), bis [o-(1,1,3,3-tetramethyl butyl)phenol] sulfide, 4–acetyl-β-resorcylic acid, A-stage p-t-butylphenolformaldehyde resin, 4-dodecyloxy-2-hydroxybenzophenone, 3-hydroxy-4-(phenylcarbonyl) phenyl palmitate, n-dodecyl ester of 3-hydroxy-4-(phenyl carbonyl) phenoxyacetic acid, and t-butyl phenol.

From 0.01–30% by weight of an epoxy compound, based on the weight of the vinyl chloride polymer in the PVC compositions of this invention may also be used. Examples of such epoxy compounds include epoxidized soya bean oil, epoxidized lard oil, epoxidized olive oil, epoxidized linseed oil, epoxidized castor oil, epoxidized peanut oil, epoxidized corn oil, epoxidized tung oil, epoxidized cottonseed oil, epichlorhydrin/bis-phenol A resins, phenoxy-propylene oxide, butoxypropylene oxide, epoxidized neopentylene oleate, glycidyl epoxystearate, epoxidized α-olefins, epoxidized glycidyl soyate, dicyclopentadiene dioxide, epoxidized butyl toluate, styrene oxide, dipentene dioxide, glycidol, vinyl cyclo-hexene dioxide, glycidyl ether of resorcinol, glycidol ether of hydroquinone, glycidyl ether of 1,5-dihyroxynaphthalene, epoxidized linseed oil fatty acids, allyl glycidyl ether, butyl glycidyl ether, cyclohexane oxide, 4-(2,3-epoxypropoxy) aceto-phenone, mesityl oxide epoxide, 2-ethyl-3-propyl glycidamide, glycidyl ethers of glycerine, pentaerythritol and sorbitol, and 3,4-epoxycyclohexane-1,1-dimethanol bis-9,10-epoxystearate.

Likewise there can be used organic phosphites in an amount of 0.01 to 10%, preferably 0.1–5% by weight of the vinyl chloride polymer. The organic phosphites contain one or more, up to a total of three, aryl, alkyl, aralkyl and alkaryl groups, in any combination. The term "trialkylaryl" is inclusive of alkyl, aryl, alkaryl and aralkyl phosphites containing any assortment of alkyl, aryl, alkaryl and aralkyl groups. Exemplary are triphenyl phosphite, tricresyl phosphite, tri (dimethylphenyl) phosphite, tributyl phosphite, trioctyl phosphite, tridodecyl phosphite, octyl diphenyl phosphite, dioctyl phenyl phosphite, phosphite, octyl diphenyl phosphite, dioctyl phenyl phosphite, tri(octyl-phenyl)

phosphite, tri(nonylphenyl) phosphite, tribenzyl phosphite, butyl dicresyl phosphite, octyl di(octyl-phenyl) phosphite, tri(2-ethyl-hexyl) phosphite, tritolyl phosphite, tri(2-cyclohexylphenyl) phosphite, tri-alpha-naphthyl phosphite, tri(phenylphenyl) phosphite, and tri(2-phenylethyl) phosphite.

Likewise there can be included from 0.01–10% by weight of the vinyl chloride polymer of a polyol stabilizer for vinyl chloride resins. Thus there can be included glycerol, sorbitol, pentaerythritol, mannitol and polyethers such as diethylene glycol, triethylene glycol, tetraethylene glycol, tripropylene glycol, and the like.

Nitrogen containing stabilizers such as dicyandiamide, melamine, urea, formoguanamine, dimethyl hydantoin, guanidine, thiourea, 2-phenylindoles, aminocrotonates, N-substituted maleimides, uracil, the 1,3-dialkyl-6-amino-uracil derivatives described in German Offenlegungsschrift 19,741,778 by Ciba Specialty Chemicals Holding Inc., and the pyrrolodiazine diones described in published Australian Patent Application No. AU-A-48232/96 by Ciba-Geigy, and the like also can be included in amounts of 0.1–10% by weight. Of particular interest are the pyrrolodiazine diones described by the formula:

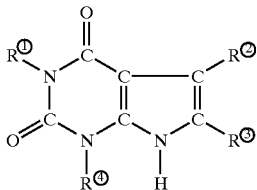

wherein $R^{①}$, $R^{②}$, $R^{③}$, and $R^{④}$ are independently hydrogen or $C_1$–$C_4$ alkyl. Examples of compounds contemplated for use in this invention include the 1H-pyrrolo[2,3-d]pyrimidine-2,4(3H,7H)-diones exemplified by Compound Nos. 103, 111, 123, 129, and 131 of said Australian Patent Application, which have the following substituents:

No. 103 1,3,6-trimethyl;
No. 111 1,3,6,7-tetramethyl;
No. 123 none;
No. 129 1,3-diethyl,6-methyl;
No. 131 1,3-di-n-butyl,6-methyl;

Said compounds may be prepared by the method described by S. Senda and K. Hirota, Chem. Pharm. Bull., 22(7), 1459–1467(1974) or by the reaction of the corresponding aminouracil with molar excesses of chloroacetaldehyde and ammonium acetate in water at about 65° C. until a precipitate forms or with molar excesses of acetoxyacetone and ammonium acetate in water at reflux for 12 hours. The German Offenlegungsschrift 19,741,778 and the Australian Patent Application No. AU-A-48232/96 are each incorporated herein by reference.

Conventional lubricants for vinyl chloride resins such as low molecular weight polyethylene, i.e. polyethylene wax, fatty acid amides, e.g. lauramide and stearamide, bisamides, e.g. decamethylene, bis amide, and fatty acid esters, e.g. butyl stearate, glyceryl stearate, linseed oil, palm oil, decyloleate, corn oil, cottonseed oil, hydrogenated cottonseed oil, stearic acid, calcium stearate, mineral oil, montan wax, oxidized polyethylene and the like can also be included.

The following examples further illustrate the preparation of blocked mercaptans of this invention, the preparation of stabilizer compositions of this invention, and the advantages of said blocked mercaptans and stabilizer compositions.

EXAMPLE 1

$^1$H-NMR spectroscopy was used to determine the molecular structure of 2-S-(decanoyloxyethylthio)tetrahydropyran or 2-S-(tetrahydropyranyl)thioethylcaprate which was prepared by adding 42.0 grams (0.50 mole) of 3,4-dihydropyran to 112.2 grams (0.50 equivalent) of mercaptoethylcaprate (14.7% SH) in the presence of an acid catalyst over a period of 45 minutes while maintaining a nitrogen atmosphere and a temperature below 35° C. and then heating it to 50° C. and holding that temperature for 1.5 hours. After cooling the solution, it was washed with two 200 ml portions of a 10% sodium bicarbonate solution in water, followed by a 200 ml wash with water. The organic layer was dried with $MgSO_4$ to yield a light yellow liquid having an SH content of less than 0.5 percent as determined by titration with a 0.100 N iodine solution in isopropanol. The $^1$H-NMR ($CDCl_3$, $\delta$) spectrum was: 2.3 (2H, t, —C(=O)—$CH_2$—$CH_2$), 2.8 (2H, m, —S—$CH_2$—$CH_2$—), 4.2 (2H, m, —S—$CH_2CH_2$—O—), 4.9 (1H, m, —O—CH(—S—$CH_2$—)—$CH_2$—$CH_2$—). The total color change (dE) of a PVC composition containing 0.13 phr of the latent mercaptan of this example was measured versus a white tile standard using a Hunter colorimeter at one minute intervals. At one minute, it was 4.2; at five minutes, it was 8.4.

EXAMPLE 2

2-S-tetrahydropyranyl) thioethyltallate was prepared by adding 172.45 grams (2.05 equiv.) of 3,4-dihydro(2H)pyran dropwise to 760.00 grams (2.00 equiv.) of 2-mercaptoethyltallate (8.70% SH by iodometric titration) containing 0.93 gram of methanesulfonic acid (70% active) over a period of 45 minutes under a nitrogen blanket and a temperature between 25–35° C. and heating to 35–40° C. for 2 hours. After cooling the solution, 3 grams of Norite carbon black was charged and the product was vacuum filtered to yield 932 grams of yellow liquid having a SH content of less than 0.4% as determined by titration with 0.100 N iodine solution in isopropanol. The $^1$H-NMR($CDCl3$,$\delta$) spectrum was: 2.3 (2H, t, —C(=O)—$CH_2$—$CH_2$—), 2.8 (2H, m, —S—$CH_2$—$CH_2$—), 4.3 (2H, m, (—CC(=O)—O—$CH_2$), 4.9 (1H, m, —O—CH(—S—$CH_2$)—$CH_2$—$CH_2$—). GC of the product (1% in ether) indicated one primary product peak at 26.3 minutes retention time (50–300° C.; 10° C./min.; split flow injector/FID).

EXAMPLES 3–11

A general flexible PVC composition containing:

| INGREDIENT | AMOUNT |
|---|---|
| PVC resin (k = 70) | 100.0 parts |
| Dioctyl phthalate | 40.0 phr |
| Epoxidized soybean oil | 5.0 phr |
| Stearic acid | 0.2 phr |
| 2-S-(tetrahydropyranyl thioethyl tallate) | 2.0 phr |
| Metal carboxylate at equal levels of metal | See Table I | was processed on a standard horizontal two-roll mill (roll speeds 30R/40R) at 350° F. with chips taken at five minute intervals to a maximum of 60 minutes. The color properties of the chips were measured using a Hunter Labs Colorimeter (L, a, b) and the yellowness index was selected as the measurement for comparison in Table II. The dynamic thermal stability (DTS) of the compositions was measured on a Brabender Plasti—Corder PL-2000 at 200° C./80rpm with No.6 roller blades and an electric head. The DTS, shown in Table III was recorded as the time in minutes before a sharp upturn in the torque curve during processing was observed.

As the data in the tables shows, all of the compositions have good dynamic stability but those containing zinc carboxylates have both dynamic stability and excellent color hold.

TABLE I

| Example | Metal Carboxylate | Amount (phr) |
|---|---|---|
| Control | None | — |
| 3 | Nickel stearate | 0.10 |
| 4 | Zinc stearate | 0.09 |
| 5 | Zinc Octoate | 0.05 |
| 6 | Tin (II) stearate | 0.05 |
| 7 | Barium stearate | 0.05 |
| 8 | Cadmium stearate | 0.06 |
| 9 | Lead (II) stearate | 0.03 |
| 10 | Aluminum stearate | 0.30 |
| 11 | Calcium stearate | 0.14 |

TABLE II

PVC Color Hold (Yellowness Index)

| Time/ Ex. | Minutes | | | | | | | | | | | |
|---|---|---|---|---|---|---|---|---|---|---|---|---|
| | 5 | 10 | 15 | 20 | 25 | 30 | 35 | 40 | 45 | 50 | 55 | 60 |
| Cntrl. | 47.1 | 77.2 | 89.1 | 101.0 | 94.3 | 99.7 | 105.4 | 99.9 | 98.1 | 93.9 | 94.2 | 89.8 |
| 3 | 54.3 | 80.5 | 93.5 | 103 | 107.7 | 112.1 | 107.8 | 111.6 | 119.9 | 111.8 | 103.5 | 119.8 |
| 4 | 9.0 | 12.3 | 11.8 | 13.4 | 16.6 | 17.2 | 21.0 | 24.6 | 30.8 | 39.8 | 48.1 | 53.2 |
| 5 | 9.7 | 11.7 | 13.9 | 14.5 | 15.6 | 16.8 | 20.6 | 22.9 | 23.8 | 31.1 | 35.8 | 40.5 |
| 6 | 50.5 | 89.2 | 96.9 | 94.9 | 106.9 | 106.6 | 107.9 | 105.0 | 98.7 | 105.4 | 102.0 | 107.1 |
| 7 | 51.0 | 86.6 | 108.5 | 116.6 | 115.6 | 118.8 | 135.0 | 134.6 | 135.4 | 138.4 | 126.1 | 133.5 |
| 8 | 16.0 | 41.7 | 47.9 | 51.2 | 52.2 | 54.8 | 56.6 | 60.9 | 65.7 | 70.9 | 72.1 | 83.2 |
| 9 | 25.4 | 56.8 | 78.2 | 82.6 | 88.6 | 95.6 | 103.9 | 96.7 | 96.1 | 101.2 | 99.9 | 107.1 |
| 10 | 51.3 | 73.5 | 81.4 | 87.2 | 93.0 | 98.8 | 101.3 | 106.0 | 111.4 | 116.1 | 116.6 | 119.2 |
| 11 | 51.9 | 80.8 | 93.2 | 109.5 | 118.4 | 126.7 | 126.7 | 143.0 | 137.6 | 141.3 | 142.3 | 139.6 |

TABLE III

Dynamic Thermal Stability

| Example | Time/minutes |
|---|---|
| Control | 43.9 |
| 3 | 43.8 |
| 4 | 40.4 |
| 5 | 45.0 |
| 6 | 51.4 |
| 7 | 53.5 |
| 8 | 48.2 |
| 9 | 50.5 |
| 10 | 45.9 |
| 11 | 61.6 |

EXAMPLES 12–15

In this example, the relationship between the compatibility of the mercaptoalkyl esters with the plasticized vinyl chloride resin and their stabilizing power is shown.

A general flexible PVC composition containing:

| INGREDIENT | AMOUNT |
|---|---|
| PVC resin (k = 70) | 100.0 parts |
| Dioctyl phthalate | 40.0 phr |
| Epoxidized soybean oil | 5.0 phr |
| Stearic acid | 0.2 phr |
| Zinc octoate (18% Zn) | 0.05 phr |
| 2-S-(tetrahydropyranyl thioethylcarboxylate) | See Table IV | was processed on a standard horizontal two-roll mill (roll speeds 30R/40R) at 350° F. with chips taken at five minute intervals to a maximum of 60 minutes. The color properties of the chips were measured using a Hunter Labs Colorimeter (L, a, b) and the yellowness index was selected as the measurement for comparison in Table V.

TABLE IV

| Example | Carboxylate | % sulfur | Amount (phr) |
|---|---|---|---|
| 12 | Hexanoate | 12.4 | 1.6 |
| 13 | Caprate | 10.4 | 1.9 |
| 14 | Tallate | 7.6 | 2.6 |
| 15 | Oleate | 7.6 | 2.6 |
| Control | None (alcohol) | 19.8 | 1.0 |

TABLE V

PVC Color Hold (Yellowness Index)

| | Minutes | | | | | | | | | | | |
|---|---|---|---|---|---|---|---|---|---|---|---|---|
| | 5 | 10 | 15 | 20 | 25 | 30 | 35 | 40 | 45 | 50 | 55 | 60 |
| 12 | 10.5 | 11.1 | 11.8 | 13.5 | 14.7 | 20.5 | 25.5 | 31.0 | 38.1 | 49.8 | 60.5 | 69.5 |
| 13 | 10.5 | 11.0 | 10.9 | 13.4 | 14.1 | 16.4 | 20.6 | 24.0 | 30.7 | 32.1 | 44.8 | 57.1 |
| 14 | 11.2 | 12.4 | 14.1 | 14.9 | 16.5 | 17.9 | 19.0 | 21.8 | 23.9 | 24.5 | 29.5 | 32.1 |
| 15 | 10.0 | 11.6 | 12.7 | 13.3 | 14.7 | 14.9 | 16.2 | 19.1 | 22.5 | 25.6 | 33.6 | 40.7 |
| Cntrl. | 10.4 | 11.9 | 13.0 | 14.3 | 16.6 | 20.4 | 23.8 | 27.3 | 34.5 | 38.2 | 48.0 | 62.1 |

EXAMPLES 16–17 AND COMPARATIVE EXAMPLE 1

The general flexible PCV formulation of Examples 12–15, was modified as shown in Table VI, and the resulting compositions were processed on a standard horizontal two-roll mill (roll speeds 30R/40R) at 350° F. with chips taken at five minute intervals to a maximum of 60 minutes. The color properties of the chips were measured using a Hunter Labs Colorimeter (L, a, b) and the yellowness index was selected as the measurement for comparison in Table VII. They were also processed on a Brabender Plasti-Corder PL-2000 with electric mixing heads (roller type 6) at 200° C./80 rpm to measure their dynamic thermal stability (DTS). The DTS, shown in Table VIII, was recorded as the time in minutes before a sharp upturn in the torque curve during processing was observed.

TABLE VI

Stabilizer Systems Evaluated

| Reference | Stabilizer | ppm Metals | Use Level, phr |
|---|---|---|---|
| Control 1 | 2-S-(tetrahydropyranyl)thioethyltallate | none | 2.05 |
| Control 2 | Zinc octoate (18% as zinc) | 2,506 | 2.05 |
| 16 | 2-S-(tetrahydropyranyl)thioethyltallate | — | 2.00 |
| | Zinc octoate (18% as zinc) | 61 | 0.05 |
| | | | 2.05 |
| 17 | Mark 859 | 706 | 1.00 |
| | 2-S-(tetrahydropyranyl)thioethyltallate | — | 1.05 |
| Comp. Ex. 1 | Mark 859 | 1,448 | 2.05 |

TABLE VII

PVC Color Hold (Yellowness Index) During Processing by Two-Roll Mill @ 350° F.

| | Minutes | | | | | | | | | | | |
|---|---|---|---|---|---|---|---|---|---|---|---|---|
| | 5 | 10 | 15 | 20 | 25 | 30 | 35 | 40 | 45 | 50 | 55 | 60 |
| C1 | 42.0 | 68.8 | 88.9 | 93.7 | 99.0 | 95.1 | 99.0 | 91.3 | 96.8 | 96.9 | 101.4 | 104.4 |
| C2 | 12.2 | 15.4 | 22.6 | 19.4 | burn | — | — | — | — | — | — | — |
| 16 | 10.5 | 11.4 | 12.0 | 12.8 | 14.7 | 16.4 | 17.5 | 19.3 | 21.1 | 22.2 | 27.8 | 34.3 |
| 17 | 11.3 | 13.5 | 15.8 | 18.3 | 20.1 | 20.2 | 20.9 | 22.1 | 20.5 | 19.4 | 22.1 | 28.8 |
| CE | 10.6 | 11.6 | 11.3 | 11.9 | 13.3 | 15.3 | 18.5 | 23.1 | 30.2 | 35.5 | 49.7 | 49.7 |

C1 = Control 1; C2 = Control 2; CE = Comparative Example 1

TABLE VIII

PVC Dynamic Thermal Stability by Brabender @ 200° C.

| Control 1 | 52.3 minutes |
|---|---|
| Control 2 | 3.7 minutes |
| 16 | 38.5 minutes |
| 17 | 52.3 minutes |
| Comparative Example 1 | 39.3 minutes |

EXAMPLE 18

This example demonstrates the use of a Lewis acid such as zinc chloride in synergy with latent mercaptans.

A general flexible PVC composition containing:

| INGREDIENT | AMOUNT |
|---|---|
| PVC resin (k = 70) | 100.0 parts |
| Dioctyl phthalate | 40.0 phr |
| Epoxidized soybean oil | 5.0 phr |
| Stearic acid | 0.2 phr | was modified as shown in Table IX and the resulting compositions were processed on a standard horizontal two-roll mill (roll speeds 30R/40R) at 350° F. with chips taken at five minute intervals to a maximum of 60 minutes. The color properties of the chips were measured using a Hunter Labs Colorimeter (L, a, b) and the yellowness index was selected as the measurement for comparison in Table X.

TABLE IX

Stabilizer Systems Evaluated

| Reference | Stabilizer | Use Level, phr |
|---|---|---|
| Control 1 | 2-S-(tetrahydropyranyl)thioethyltallate | 2.02 |
| Control 2 | Zinc chloride (anhydrous) | 0.02 |
| 18 | 2-S-(tetrahydropyranyl)thioethyltallate | 2.00 |
|  | Zinc chloride (anhydrous) | 0.02 |

TABLE X

PVC Color Hold (Yellowness Index) During Processing by Two-Roll Mill @ 350° F.

| min/ex | 5 | 10 | 15 | 20 | 25 | 30 | 35 | 40 | 45 | 50 | 55 | 60 |
|---|---|---|---|---|---|---|---|---|---|---|---|---|
| C1 | 48.5 | 90.6 | 106.8 | 115.9 | 121.2 | 132.2 | 127.3 | 122.6 | 113.9 | 110.5 | 98.8 | 84.2 |
| C2 | 18.3 | 26.7 | 46.1 | 68.8 | 45.2 | burn | — | — | — | — | — | — |
| 18 | 14.9 | 16.1 | 18.1 | 19.8 | 20.8 | 22.4 | 23.6 | 26.5 | 26.0 | 26.3 | 28.2 | 28.9 |

EXAMPLES 19–20 AND COMPARATIVE EXAMPLE 2

Whereas the surprising effect of very low levels of metallic-based stabilizers on 2-S-(tetrahydropyranyl) thioalkyl carboxylates in flexible PVC compositions has been shown above, the role played by the better compatibility of a 2-S-(tetrahydropyranyl)thioalkanol in combination with such low levels of metallic-based stabilizers in a rigid PVC is shown in the following examples.

A conventional rigid PVC composition containing:

| INGREDIENT | AMOUNT |
|---|---|
| PVC resin (k = 65) | 100.0 parts |
| Calcium carbonate | 5.00 phr |
| Titanium dioxide | 1.0 phr |
| Calcium stearate | 0.6 phr |
| Paraffin wax | 1.2 phr |
| Oxidized polyethylene | 0.15 phr | was modified as shown in Table XI and the resulting compositions were processed on a standard horizontal two-roll mill (roll speeds 30R/40R) at 390° F. with chips taken at one minute intervals to a maximum of 12 minutes. The color properties of the chips were measured using a Hunter Labs Colorimeter (L, a, b) and the yellowness index was selected as the measurement for comparison in Table XII. The DTS, measured as described above but at 190° C., is shown in Table XIII.

TABLE XI

Stabilizer Systems Evaluated

| Reference | Stabilizer | Use Level, phr |
|---|---|---|
| Comp. Ex. 2 | ADVASTAB TM-694 stabilizer* | 0.40 |
| 19 | 2-S-(tetrahydropyranyl)thioethanol** | 2.50 |
|  | Zinc octoate (18% zinc)I | 0.05 |
| 20 | 2-S-(tetrahydropyranyl)thioethyltallate | 2.00 |
|  | Zinc octoate (18% zinc) | 0.05 |
|  | Dibenzoylmethane | 0.05 |

*ADVASTAB is a registered trademark of Morton International, Inc.
**includes minor amounts of compounds of Formulas 3–7.

TABLE XII

PVC Color Hold (Yellowness Index) During Processing by Two-Roll Mill @ 390° F.

| min/ex | 1 | 2 | 3 | 4 | 5 | 6 | 7 | 8 | 9 | 10 | 11 | 12 |
|---|---|---|---|---|---|---|---|---|---|---|---|---|
| CE 2 | 3.0 | 3.9 | 4.5 | 5.1 | 5.8 | 7.2 | 9.3 | 11.5 | 14.2 | 16.8 | 18.6 | 21.5 |
| 19 | 4.8 | 7.4 | 7.9 | 7.6 | 7.3 | 7.7 | 7.8 | 9.8 | 12.8 | 16.5 | 20.5 | 24.4 |
| 20 | 4.3 | 5.9 | 9.0 | 11.9 | 14.0 | 15.9 | 17.1 | 17.4 | 16.4 | 18.3 | 21.9 | 26.3 |

TABLE XIII

PVC Dynamic Thermal Stability by Brabender @ 190° C.

|  | Minutes |
|---|---|
| Comparative Example 2 | 6.3 |
| 19 | 18.0 |
| 20 | 6.1 |

EXAMPLES 21–22 AND COMPARATIVE EXAMPLES 3–4

The activating effect of a Lewis acid and of a metallic-based stabilizer on a latent mercaptan according to this invention, when used alone and in combination, is shown in this example.

A conventional rigid PVC composition containing:

| INGREDIENT | AMOUNT |
|---|---|
| PVC resin (k = 65) | 100.0 parts |
| Calcium carbonate | 5.00 phr |
| Titanium dioxide | 1.0 phr |
| Calcium stearate | 0.6 phr |
| Paraffin wax | 1.2 phr |
| Oxidized polyethylene | 0.15 phr | was modified as shown in Table XIV and the resulting compositions were processed on a standard horizontal two-roll mill (roll speeds 30R/40R) at 390° F. with chips taken at one minute intervals to a maximum of 11 minutes. The color properties of the chips were measured using a Hunter Labs Colorimeter (L, a, b) and the yellowness index was selected as the measurement for comparison in Table XV.

TABLE XIV

Stabilizer Systems Evaluated

| Reference | Stabilizer | Use Level, phr |
|---|---|---|
| Comp. Ex. 3 | ADVASTAB TM-599T* | 0.25 |
| Comp. Ex. 4 | ADVASTAB TM-599T* | 0.235 |
|  | Methyltin trichloride | 0.015 |
| 21 | 2-S-(tetrahydropyranyl)thioethanol** | 0.05 |
|  | ADVASTAB TM-599T* | 0.235 |
|  | Methyltin trichloride | 0.015 |
| 22 | 2-S-(tetrahydropyranyl(thioethanol** | 0.05 |
|  | ADVASTAB TM-599T* | 0.25 |

*ADVASTAB is a registered trademark of Morton International, Inc.
**includes minor amounts of compounds of Formulas 3–7

TABLE XV

PVC Color Hold (Yellowness Index) During Processing by Two-Roll Mill @ 390° F.

| min/ex | 1 | 2 | 3 | 4 | 5 | 6 | 7 | 8 | 9 | 10 | 11 |
|---|---|---|---|---|---|---|---|---|---|---|---|
| CE 3 | 6.7 | 8.2 | 9.1 | 10.2 | 12.0 | 14.5 | 18.2 | 22.3 | 25.2 | 26.0 | 29.4 |
| CE 4 | 4.6 | 5.6 | 6.8 | 8.8 | 12.2 | 16.0 | 19.8 | 23.4 | 24.6 | 27.3 | 29.5 |
| 21 | 4.0 | 4.1 | 4.6 | 5.7 | 7.2 | 11.4 | 14.0 | 17.9 | 20.8 | 23.3 | 26.4 |
| 22 | 5.1 | 6.2 | 6.3 | 7.0 | 8.2 | 11.4 | 15.1 | 19.1 | 21.0 | 24.0 | 26.5 |

EXAMPLE 23

Preparation of Intermediate A mixture of 736.16 grams (8 moles) of thioglycolic acid, 848.96 grams (8 moles) of diethyleneglycol, and 1.3 grams of p-toluene sulfonic acid was heated to 80° C. at a pressure of 400 Torr in a reactor equipped with a mechanical stirrer, a thermometer, and a vacuum take-off condenser. The refluxing temperature was held for 1 hour before the pressure was reduced to 120 Torr over a period of 2.5 hours to remove water formed by the esterification. The temperature rose to 120° C. as the pressure was further reduced to 20 Torr over a period of 0.5 hour. The total weight of water removed was 140.92 grams. The product has an acid value of 12 and an SH content of 16.75% by weight. The yield was 1421.12 grams. The product was a mixture of the diethyleneglycol mono- and diesters of thioglycolic acid (i.e., hydroxyethyloxyethylmercaptoacetate and ethyloxyethyl di-mercaptoacetate) and was satisfactory.

Preparation of Adduct

To the 1421 grams (7.89 equivalents) of intermediate thus produced there was added 6.38 grams of AMBERLYST 15 ion exchange resin and then 708.21 grams (8.42 equivalents) of 3,4-dihydro(2H)pyran (DHP) was added dropwise over a period of 135 minutes under a nitrogen blanket at a temperature 40–50° C. After continued heating at 40–50° C. for 2.25 hours, the % SH was 5.36. Another charge of DHP weighing 300.21 grams (about 3.5 moles) was added during a period of 0.5 hour and the reaction mixture was held at about 55° C. for 0.5 hour to reduce the % SH to 3,32. After standing overnight (about 14 hours) under nitrogen, the product had an SH content of 2.68%.

The product was a mixture containing 2-S-(tetrahydropyranyl) hydroxyethyloxyethylthioglycolate, wherein $R^1$ is hydroxyethoxyethoxyacetylmethyl, and bis-[2-S-(tetrahydropyranyl)ethyloxyethyl] thioglycolate, wherein y is 2 and $R^1$ is oxy[bis(ethoxyacetylmethyl)].

EXAMPLE 24

Preparation of Intermediate

A mixture of 98.23 grams (1.07 moles) of thioglycolic acid, 160.06 grams (1.07 moles) of triethyleneglycol, and 0.2 gram of p-toluene sulfonic acid was heated to 100° C. at a pressure of 250 Torr in a reactor equipped with a mechanical stirrer, a thermometer, and a vacuum take-off condenser. The refluxing temperature was held for 25 minutes before the pressure was reduced to 10 Torr over a period of 1.5 hours to remove water formed by the esterification. The product contained the triethyleneglycol monoester (about 57% of the total weight) and the triethyleneglycol diester of thioglycolic acid (about 20%) and was satisfactory.

Preparation of Adduct

A mixture containing (2-S-tetrahydropyranyl) hydroxyethyloxyethyloxyethylthioglycolate and bis-(2-S-tetrahydropyranyl)ethyloxyethyloxyethyl di-thioglycolate was prepared by cooling 100 grams (0.42 equivalent of SH) of the thus prepared mixture of triethyleneglycol mono- and diesters of thioglycolic acid along with 0.2 gram of AMBERLYST 15 ion exchange resin to 0° C. and adding 39.18 grams (0.462 mole) of DHP dropwise over a period of 30 minutes. The mixture was held at 0° C. for 1 hour and then heated gradually to room temperature (about 22° C.) and held there for 2 hours. The yield of product was 139.2 grams and the SH content was 3.5%.

EXAMPLE 25

Preparation of Intermediate

A mixture of 92.0 grams (1 mole) of thioglycolic acid, 212.21 grams (2 moles) of diethyleneglycol, and 0.24 gram of p-toluene sulfonic acid was heated to 100° C. at a pressure of 200 Torr in a reactor equipped with a mechanical stirrer, a thermometer, and a vacuum take-off condenser. The temperature was held for 0.5 hour before the pressure was reduced to 10 Torr over a period of 1.9 hours and then held for 70 minutes to remove water formed by the esterification. The temperature was raised to 110° C. as the pressure was further reduced to less than 1 Torr over a period and held for 3 hours. The diethyleneglycol mono-ester of thioglycolic acid constituted 85.9% and the diester constituted 14.1% of the weight of the product. The SH content of the product was 19.49% by weight, which was satisfactory.

Preparation of Adduct

A mixture of 70 grams (0.412 equivalent) of the intermediate thus produced and 0.15 gram of AMBERLYST 15 ion exchange resin was cooled to less than 0.5° C. and then 36.52 grams (0.434 equivalent) of DHP was added dropwise over a period of about 7 minutes and after 3 hours it was warmed to room temperature (about 22° C.).

EXAMPLES 26–28 AND COMPARATIVE EXAMPLES 5 & 6

A conventional rigid PVC composition containing:

| INGREDIENT | AMOUNT |
| --- | --- |
| PVC resin (k = 65) | 100.0 parts |
| Calcium carbonate | 5.00 phr |
| Titanium dioxide | 1.0 phr |
| Calcium stearate | 0.6* phr |
| Paraffin wax | 1.2 phr |
| Oxidized polyethylene | 0.15 phr |

*0.45 in Comp. Ex. 4 and Ex. 28 was modified as shown in Table XVI and the resulting compositions were processed on a standard horizontal two-roll mill (roll speeds 30R/40R) at 390° F. with chips taken at one minute intervals to a maximum of 12 minutes. The color properties of the chips were measured using a Hunter Labs Colorimeter (L, a, b) and the dE was selected as the measurement for comparison in Table XVII. The DTS, measured as described above but at 190° C., is shown in Table XVIII.

TABLE XVI

Stabilizer Systems Evaluated

| Reference | Stabilizer | Use Level, phr |
| --- | --- | --- |
| Comp. Ex. 5 | ADVASTAB TM-599 stabilizer | 0.45* |
| Comp. Ex. 6 | ADVASTAB LS-203 lube & stabilizer** | 2.40 |
| 26 | Product of Example 22 | 0.70 |
|  | Zinc octoate (18% zinc)I | 0.13 |
| 27 | Product of Example 23 | 0.70 |
|  | Zinc octoate (18% zinc) | 0.13 |
| 28 | Product of Example 24 | 0.70 |
|  | Zinc octoate (18% zinc) | 0.13 |

*Higher than normal amount for PVC pipe
**TM-599 plus lubricant

TABLE XVII

PVC Color Hold (dE) During Processing by Two-Roll Mill @ 390° F.

| min/ex | 1 | 2 | 3 | 4 | 5 | 6 | 7 | 8 | 9 | 10 | 11 | 12 |
| --- | --- | --- | --- | --- | --- | --- | --- | --- | --- | --- | --- | --- |
| CE 5 | 15.8 | 15.8 | 16.1 | 15.8 | 16.0 | 15.9 | 16.8 | 17.2 | 17.9 | 18.5 | 20.0 | 21.2 |
| 26 | 16.7 | 16.2 | 15.7 | 16.1 | 15.8 | 16.9 | 17.5 | 18.6 | 21.4 | 27.0 | 36.2 | 43.2 |
| 27 | 16.0 | 15.4 | 15.5 | 15.4 | 16.1 | 16.5 | 18.3 | 24.4 | 28.6 | 40.8 | 46.8 | 48.8 |
| CE 6 | 11.5 | 11.7 | 12.3 | 13.0 | 12.1 | 13.2 | 14.5 | 14.7 | 15.4 | 16.7 | 18.8 | 19.9 |
| 28 | 12.3 | 11.5 | 12.1 | 12.7 | 12.2 | 14.3 | 15.7 | 20.5 | 28.9 | 35.9 | 41.5 | 42.8 |

TABLE XVIII

PVC Dynamic Thermal Stability by Brabender @ 190° C.

|  | Minutes |
| --- | --- |
| Comparative Example 5 | 9.6 |
| 26 | 9.9 |
| 27 | 8.6 |
| Comparative Example 6 | 13.9 |
| 28 | 9.9 |

EXAMPLE 29 AND COMPARATIVE EXAMPLE 7

The following examples compare the thermal stability of a semi-rigid PVC composition containing a homogeneous blend of zinc chloride and the latent mercaptan of this invention (Formula 2 along with the by-products shown by Formulas 3–7) with that of a semi-rigid PVC composition containing a commercial Cd/Ba/Zn/phosphite stabilizer.

The homogeneous blend of zinc chloride and the latent mercaptan was prepared by charging dropwise a solution of 16.0 grams of anhydrous zinc chloride in 50 mls of dry acetone into 333.2 grams of the latent mercaptan with stirring at 30° C. under a nitrogen blanket and then removing the acetone by heating the solution at 55° C. for one hour under a reduced pressure of 15 mm Hg. Filtration of the remaining liquid yielded a sparkling clear homogeneous product having a zinc content of 2.1% by weight.

A conventional semi-rigid PVC composition containing:

| INGREDIENT | AMOUNT |
| --- | --- |
| PVC resin (k = 70) | 100.0 parts |
| Diisodecyl phthalate | 27.0 |
| Epoxidized soybean oil | 3.0 |
| Calcium carbonate | 30.0 phr |
| Stearic acid | 0.5 phr | was modified as shown in Table XIX and the resulting compositions were processed on a standard horizontal two-roll mill (roll speeds 30R/40R) at 350° F. with chips taken at five minute intervals to a maximum of 60 minutes. The color properties of the chips were measured using a Hunter Labs Colorimeter (L, a, b) and the yellowness index was selected as the measurement for comparison in Table XX.

TABLE XIX

Stabilizer Systems Evaluated

| Example | Stabilizer | Use Level, phr |
|---|---|---|
| 30 | Product of Example 29 | 2.25 |
| Comp. Ex. 7 | Liquid Cd/Ba/Zn/phosphite | 3.00 |
|  | Solid Ba/Zn booster | 0.50 |

TABLE XX

PVC Color Hold (YI) During Processing by Two-Roll Mill @ 350° F.

| min/ex | 5 | 10 | 15 | 20 | 25 | 30 | 35 | 40 | 45 | 50 | 55 | 60 |
|---|---|---|---|---|---|---|---|---|---|---|---|---|
| 30 | 14.8 | 16.9 | 18.8 | 20.2 | 21.4 | 22.7 | 24.8 | 27.3 | 31.3 | 35.6 | 39.4 | 45.3 |
| CE 7 | 16.7 | 21.1 | 25.2 | 28.5 | 31.7 | 34.0 | 36.4 | 38.6 | 41.4 | 44.2 | 46.0 | 48.3 |

The DTS, recorded as the point at which a sharp upturn in the torque rheometry curve occurs at 200° C. on a BRABENDER PL-2000 rheometer having an electric head and No. 6 roller blades, is shown in Table XXI.

TABLE XXI

PVC Dynamic Thermal Stability by Brabender @ 200° C., 80 rpm

| 30 | 25.4 minutes |
|---|---|
| Comparative Example 7 | 26.5 minutes |

The preferred ratio of zinc to sulfur, as they occur in the various combinations of zinc carboxylate or zinc chloride with the latent mercaptan of this invention to make a stabilizer for certain applications of the flexible PVC compositions of this invention, is as shown in Table XXII:

TABLE XXII

| APPLICATION | % Filler | Zn:S Ratio | % Zn in stabilizer |
|---|---|---|---|
| Clear calender and extrusion | 0.0 | 0.06:1 | 0.4 |
| Low fill calender and extrusion; W + C | ≦10 | 0.12:1 | 0.9 |
| Mod. filled calender and extrusion; awning | 10–25 | 0.18:1 | 1.3 |
| Mod. filled calender and extrusion | 10–25 | 0.24:1 | 1.7 |
| High filled calender and extrusion | 25.0 | 0.32:1 | 2.2 |
| Filled plastisol | N/A | 0.60:1 | 3.6 |

Articles of manufacture contemplated by this invention, e.g. packaging film, tubing, rigid pipe, and window profile, are formed from the stabilized compositions of this invention by any of the well-known conventional techniques for forming polymers into shaped articles.

While a few specific embodiments of this invention have been disclosed in considerable detail, variations and modifications of these embodiments can be effected without departing from the spirit and scope of the invention as disclosed and claimed herein.

What is claimed is:

1. A polymer composition comprising a halogen-containing polymer and degradation products of a blocked mercaptan present during processing of the composition at an elevated temperature, said blocked mercaptan having the structure:

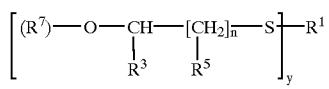

wherein n is 0 or 1; y is 1 or 2; $R^1$ is a hydroxyalkyl, hydroxy(polyalkoxy)alkyl, acyloxyalkyl, acyloxy (hydroxyalkyl), acyloxy(alkoxyalkyl), acyloxy (polyalkoxy)alkyl, benzoyloxy(polyalkoxy)alkyl, or alkylene bis-(acyloxyalkyl) group in which the alkyl moieties have from 2 to 20 carbon atoms, the acyloxy moieties have from 2 to 22 carbon atoms; and either $R^3$ or $R^5$ is joined with $R^7$ and O to form a heterocyclic moiety; and between 0.005% and 0.5% of a zinc salt selected from the group consisting of zinc chloride and a zinc carboxylate, based on the weight of the polymer.

2. The composition of claim 1 wherein the zinc salt is a zinc carboxylate and the amount is between 0.01 and 0.1%.

3. The composition of claim 1 wherein the alkyl moieties are ethyl.

4. The composition of claim 1 wherein the zinc salt is zinc chloride.

5. The composition of claim 1 wherein the halogen-containing polymer is a flexible PVC composition and $R^1$ is an acyloxyalkyl group.

6. The composition of claim 5 wherein the zinc salt is zinc chloride and the amount is between 0.005 and 0.1%.

7. The composition of claim 5 wherein the alkyl moieties are ethyl.

8. The composition of claim 1 wherein the halogen-containing polymer is a rigid PVC composition and $R^1$ is a hydroxyalkyl group.

9. The composition of claim 8 wherein the zinc salt is a zinc carboxylate and the amount is between 0.01 and 0.1%.

10. The composition of claim 8 wherein the zinc salt is zinc chloride and the amount is between 0.005 and 0.1%.

11. The composition of claim 8 wherein the alkyl moieties are ethyl.

12. The composition of claim 1 wherein the halogen-containing polymer is a rigid PVC composition and $R^1$ is a hydroxy(polyhydroxy)alkyl group.

* * * * *